Patented July 20, 1937

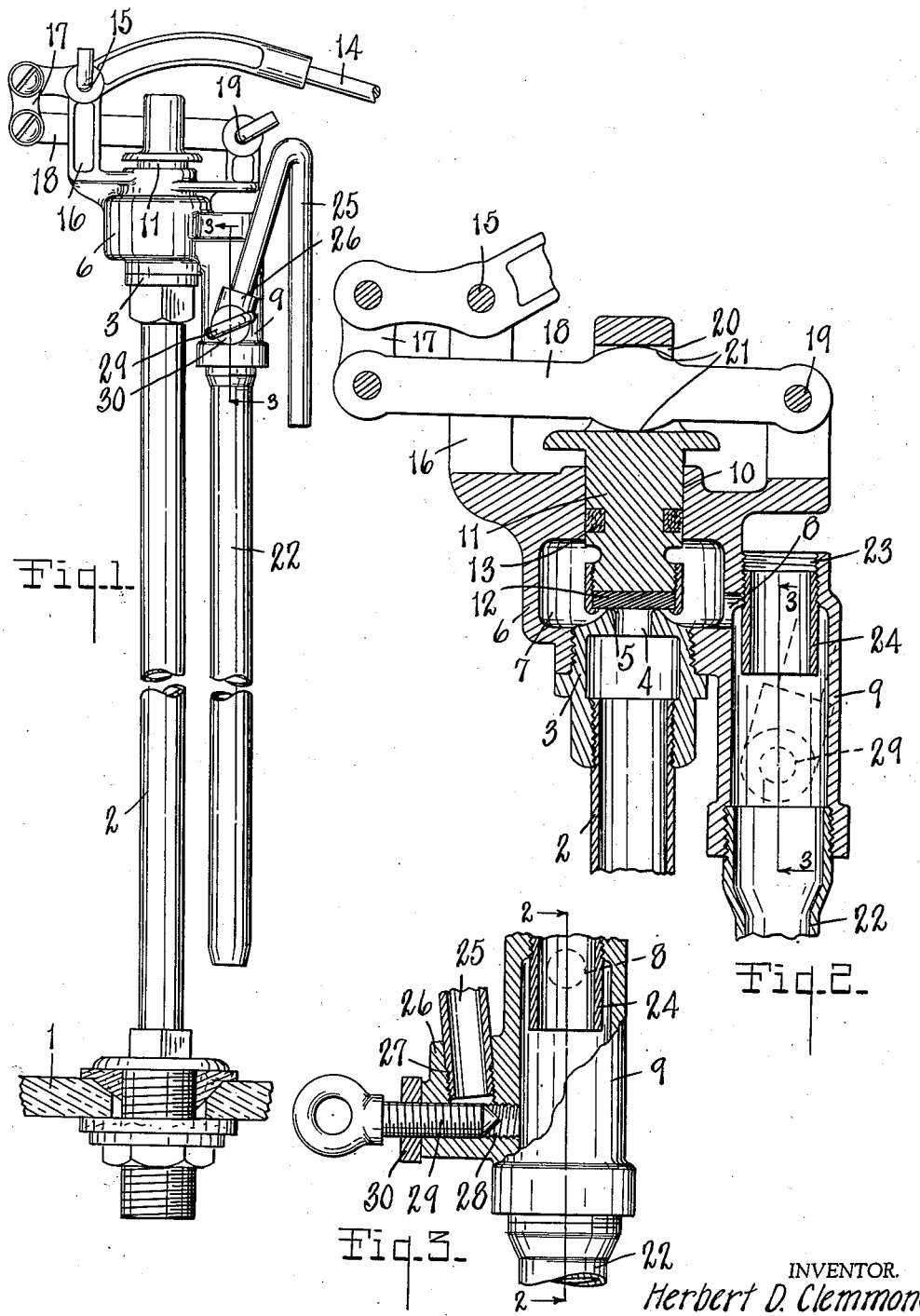

2,087,503

UNITED STATES PATENT OFFICE 2,087,503

VALVE ASSEMBLY FOR FLUSHING TANKS

Herbert D. Clemmons, Sturgis, Mich., assignor to Scovill Manufacturing Company, Sturgis, Mich.

Application March 25, 1936, Serial No. 70,785

3 Claims. (Cl. 137—111)

Owing to the fact that water supply systems are sometimes contaminated because of back-siphonage into the system from flushing tanks, there is a recognized need for a flush tank assembly which will avoid or eliminate such conditions or an assembly which renders it impossible or practically impossible for such back-siphonage to occur.

The main objects of this invention are:

First, to provide a ball cock or valve assembly for flushing tanks which entirely overcomes or reduces to a minimum the possibility of back-siphoning of the water from the tank into the supply system.

Second, to provide a structure accomplishing these results which, while efficient, is simple and economical in its parts and not likely to become clogged or defective in use.

Objects pertaining to details and economies of my invention will definitely appear from the description to follow. The invention is defined and pointed out in the claims.

A structure which embodies the features of my invention is clearly illustrated in the accompanying drawing, in which:

Fig. 1 is a fragmentary elevation of a ball cock or valve assembly for flushing tanks embodying the features of my invention.

Fig. 2 is an enlarged detail mainly in section on line 2—2 of Fig. 3.

Fig. 3 is an enlarged detail partially in section on line 3—3 of Figs. 1 and 2.

In the embodiment of my invention illustrated in the accompanying drawing, I represents a flushing tank and 2 the supply pipe or riser within the tank which is connected to a suitable source of water supply. This is mounted, as customary, in the bottom of the tank and is designed to be connected to the source of water supply such as a city system.

On the upper end of the riser 2 is a valve seat member 3 of the valve casing, this member 3 having a nozzle 4 surrounded by the valve seat 5. The body 6 of the valve casing is provided with a discharge or valve chamber 7 having a lateral discharge opening 8 delivering to the vertically disposed discharge conduit 9. This conduit is preferably formed as an integral part of the valve body. The valve casing has a bore 10 in line with the valve seat receiving the plunger valve 11 which has a suitable facing 12 coacting with the valve seat. This plunger is provided with a packing 13 coacting with the walls of the bore. The valve is controlled from the float, not shown, the float lever or arm 14 being pivoted at 15 on the bracket 16 and connected by the link 17 to the valve lever 18 which is pivoted at 19 to engage the opening 20 in the valve.

The valve lever has opposed curved surfaces 21 coacting with the top and bottom portions of the opening 20 so that as the lever is reciprocated the plunger is raised and lowered. The discharge conduit 9 has a discharge pipe 22 threaded into the lower end thereof and constituting an extension therefor, this pipe terminating near the bottom of the tank so that the incoming water is discharged at the bottom of the tank. The conduit 9 has an opening 23 at the top thereof and is preferably internally threaded to receive the air inlet tube 24. This air inlet tube is thus secured to the conduit above the opening 8 and projects substantially below that opening so that the tube constitutes a baffle and directing means, directing the incoming water downwardly through the discharge tube and at the same time allowing air to enter at the upper end of the conduit.

The bent refill tube 25 is connected to a boss 26 on the side of the conduit 9, the boss being bored and tapped at 27 to receive the inner end of the refill tube and also bored and tapped at 28 to receive the threaded valve 29, a lock nut 30 being provided for securing this valve in adjusted position.

In operation, during the discharge of water, particularly under high pressure, some water may pass upwardly through the air tube but not with sufficient force to be discharged as a jet. However, in the event of a vacuum in the water supply system or in the supply pipe 2, air is admitted through the top opening of the discharge conduit to break such vacuum and thus prevent polluted water from being sucked up through the discharge pipe and into the system.

The device is found to be highly efficient for the purpose and at the same time there are no moving parts involved in the anti-back siphonage portion of the assembly, so there is little possibility or likelihood of the device becoming inoperative through clogging, deposit of sediment or the like. Further, the structure is very economical in its parts.

I have illustrated and described my improvements in an embodiment which I have found highly satisfactory. I have not attempted to illustrate or describe certain adaptations or modifications to other forms of ball cocks which I contemplate as I believe this disclosure will enable those skilled in the art to embody or adapt my improvements as may be desired.

Having thus described my invention what I claim as new and desire to secure by Letters Patent is:

1. In a valve assembly for flushing tanks, the combination with a supply pipe, of an inlet valve operatively associated therewith, a valve casing mounted on said supply pipe and having a valve chamber and provided with a downwardly directed discharge conduit communicating with said valve chamber through a relatively restricted opening and having a downwardly projecting discharge pipe connected thereto, said discharge conduit being open at the top thereof, and an air inlet tube mounted in the upper end of said discharge conduit above said discharge chamber opening and depending in said conduit in concentric relation to the walls thereof, the lower end of said tube being substantially below the discharge opening of said valve chamber.

2. In a valve assembly for flushing tanks, the combination with a supply pipe, of an inlet valve operatively associated with said supply pipe and provided with a casing having a vertically disposed discharge conduit open at the top, a discharge pipe connected to the lower end of said conduit, and an air inlet tube mounted in the upper end of said conduit above the inlet opening of said conduit and depending within said conduit to a point substantially below the inlet of the conduit whereby the incoming water is directed downwardly by said tube and the tube constitutes an air inlet and a baffle for the top opening of the conduit.

3. In a valve assembly for flushing tanks, the combination of a supply pipe, a valve operatively associated therewith and provided with a downwardly directed discharge conduit open at the top, and an air inlet tube disposed concentrically within said discharge conduit to depend below the water inlet to said discharge conduit.

HERBERT D. CLEMMONS.